United States Patent
Peleg et al.

(10) Patent No.: US 10,860,217 B2
(45) Date of Patent: Dec. 8, 2020

(54) SYSTEM AND METHOD OF MANAGEMENT OF MULTI-TIER STORAGE SYSTEMS

(71) Applicant: Reduxio Systems Ltd., Tel Aviv (IL)

(72) Inventors: Nir Peleg, Tel-Aviv (IL); Or Sagi, Tel-Aviv (IL)

(73) Assignee: Reduxio Systems Ltd., Tel-Aviv (IL)

( * ) Notice: Subject to any disclaimer, the term of this patent is extended or adjusted under 35 U.S.C. 154(b) by 0 days.

(21) Appl. No.: 16/449,615

(22) Filed: Jun. 24, 2019

(65) Prior Publication Data

US 2020/0026438 A1 Jan. 23, 2020

Related U.S. Application Data

(60) Provisional application No. 62/701,864, filed on Jul. 23, 2018.

(51) Int. Cl.
*G06F 3/06* (2006.01)
*G06F 9/54* (2006.01)
*G06F 12/10* (2016.01)

(52) U.S. Cl.
CPC .......... *G06F 3/0613* (2013.01); *G06F 3/0659* (2013.01); *G06F 3/0685* (2013.01); *G06F 9/54* (2013.01); *G06F 12/10* (2013.01); *G06F 2212/1016* (2013.01); *G06F 2212/657* (2013.01)

(58) Field of Classification Search
None
See application file for complete search history.

(56) References Cited

U.S. PATENT DOCUMENTS

| 2006/0069862 A1* | 3/2006 | Kano | G06F 3/0647 |
| | | | 711/114 |
| 2016/0077750 A1* | 3/2016 | Erdmann | G06F 3/0685 |
| | | | 711/114 |
| 2020/0225868 A1* | 7/2020 | Dalmatov | G06F 3/061 |

* cited by examiner

*Primary Examiner* — Kevin Verbrugge
(74) *Attorney, Agent, or Firm* — Pearl Cohen Zedek Latzer Baratz LLP

(57) ABSTRACT

A system and a method of managing a plurality of storage tiers, may include: receiving a write-access request, including at least one data element for storage, a logical address associated with the data element and a tier identifier for a selected tier; computing a unique reference name based on the content of the data element, and associating the unique reference name with the logical address; using a global API to generate a first write-access command, that includes the unique reference name and the data element; customizing the write-access command according to an addressing scheme of the selected tier by a dedicated driver, to obtain at least one second write-access command; using the second write-access command to associate the unique reference name with at least one physical location on the selected tier; and storing the at least one data element at the associated at least one physical location.

16 Claims, 6 Drawing Sheets

SYSTEM AND METHOD OF MANAGEMENT OF MULTI-TIER STORAGE SYSTEMS

CROSS-REFERENCE TO RELATED APPLICATIONS

This application is claiming the benefit of U.S. Patent Application No. 62/701,864, filed Jul. 23, 2018, which is hereby incorporated by reference.

FIELD OF THE INVENTION

The present invention relates generally to computer and digital data storage systems. More specifically, the present invention relates to methods and systems for management of multi-tier storage.

BACKGROUND OF THE INVENTION

Computer storage systems are normally configured to store data on one or more physical storage devices or media, commonly referred to as storage tiers, such as hard-disk drives, non-volatile memory devices and solid-state drives. Commercially available storage tiers are diversified by a plurality of properties or characteristics.

For example, storage tiers may have or may be characterized and differentiated from each other by different structures, including for example being of a different size, store data on physical data blocks of a different size, etc.

Storage tiers may facilitate different schemes for data access, such as key-value addressing schemes, block addressing schemes, object addressing schemes, file addressing scheme, etc., as known in the art.

The diversity among storage tiers presents a number of challenges or difficulties for storage systems that employ a multi-tier architecture or constellation, including multiple storage tiers that may have different properties or characteristics. For example:

multi-tier storage systems may need to represent and/or address data by high-layer constructs (e.g., software applications) according to the data's physical storage;

multi-tier storage systems may need to translate or adapt a reference or address of a stored data object in order to move or migrate the data object from one storage device to another, and multi-tier storage systems may need to translate or adapt a reference or address of a stored data object in order to de-duplicate stored data objects (e.g., clear memory space by identifying duplicate data storage and purging redundant memory space for future use).

For example, an application that may be executed on a computing device may require a snapshot (e.g. a representation at a predefined point in time) of data that may be stored on a first storage device, having a first storage scheme (e.g. a block storage media, having a first block size). The snapshot may represent the point-in-time image of a data element (e.g. a file, an object, a volume, etc.) as a collection of pointers, according to the first storage scheme (e.g. pointers to blocks of the first block size). If the first storage device is replaced with a second storage device, having a second storage scheme (e.g. a second block storage media, having a second block size), the representation of the snapshot data will require modification of the pointers, to accommodate the change. Such modification may be time-consuming and may require computational resources such as memory space and processing cycles and may thus render the multi-tier storage system to work inefficiently.

SUMMARY OF THE INVENTION

A system and a method of seamless management of multi-tier storage, that will allow efficient transfer of data between computing devices and one or more storage devices of different characteristics or properties such as storage schemes and block sizes is therefore desired.

Embodiments of the present invention include a method and a system for managing a multi-tier storage system that may include one or more (e.g., a plurality) of storage tiers by at least one processor. The method may include addressing data on one or more tiers in a manner that is media-independent and/or tier-independent, in a sense that it may be dissociated or unrelated to any specific addressing scheme, and thus enabling data management operations to be agnostic of tier-specific structure and addressing scheme, as elaborated herein.

Moreover, media-independent addressing, as elaborated herein, may improve data storage technology by facilitating the introduction of new tiers to the multi-tier storage system, that may include new media types and may employ novel addressing schemes, without affecting existing data management functions or references.

Pertaining to the example of the snapshot provided above, media-independent addressing may obtain the snapshot data by maintaining a collection of media-independent name references, rather than pointers to physical addresses, and may thus keep the same snapshot image format, without requiring modification thereof, as elaborated herein.

Embodiments of the present invention include a system and a method of managing a plurality (e.g., two or more) of storage tiers by at least one processor. Embodiments of the method may include, for example: receiving at least one data manipulation operation (DMO) command that may include at least one logical address of a respective at least one data element; obtaining a unique reference name that may be associated with the logical address; generating a global DMO command that may include the unique reference name and that may be dissociated from the logical address; customizing the global DMO command according to at least one characteristic of a specific storage tier of the plurality of storage tiers, to obtain a tier-specific DMO command; and applying the tier-specific DMO command on the specific storage tier.

According to some embodiments, generation of a global DMO may be done by a global Application Programming Interface (API) that may be agnostic to at least one characteristic of the plurality of storage tiers.

The DMO may be or may include, for example: a write-access command, a write-access acknowledgement, a read-access command, a read-access acknowledgement, an erase command, a transfer command and a copy command.

The received DMO may include a content of at least one data element, and embodiments of the method may further include: computing the unique reference name based on the content of the at least one data element; and associating the unique reference name with the logical address.

The at least one characteristic of a specific storage tier may be or may include for example, the storage media's type, storage media's size, the storage media's addressing scheme and size of physical storage blocks on the storage media.

Embodiments of the present invention may include method of managing a plurality of storage tiers by at least one processor. Embodiments of the method may include: receiving at least one write-access request that may include at least one of a data element for storage, a logical address associated with the data element and a tier identifier for a selected tier; computing a unique reference name based on the content of the at least one data element, and associating the unique reference name with the logical address; generating a first write-access command, may include the unique reference name and the at least one data element; customizing the first write-access command according to at least one characteristic of the selected tier by a driver associated with the selected tier, to obtain at least one second write-access command; using the second write-access command to associate the unique reference name with at least one physical location on the selected tier, and storing the at least one data element at the associated at least one physical location.

Embodiments of the method may further include: receiving at least one read-access request that may include at least one of a logical address and a tier identifier of a selected tier, obtaining a unique reference name that may be associated with the at least one logical address; generating a first read-access command, may include the unique reference name; customizing the first read-access command according to at least one characteristic of the selected tier by a driver associated with the selected tier, to obtain at least one second read-access command; using the second read-access command to search the selected storage tier for a data element that corresponds to the unique reference name; and retrieving the at least one data element from the selected tier.

The at least one characteristic may be or may include for example: a storage media type, a storage media size, an addressing scheme of a storage media and a size of storage blocks of a storage media.

The at least one data element for storage may be a data container that may include a plurality of data elements. The logical address associated with the data container may include at least one of: a container identifier and an address offset to a data element within the data container. Computing of a unique reference name may be applied to each of the data elements.

Embodiments of the method may further include: receiving a transfer request of a data element from a first tier to a second tier, wherein the transfer request may include at least one of a logical address, a tier identifier of the first tier and a tier identifier of the second tier, obtaining, by a driver associated with the first tier, a read-access command that complies with the addressing scheme of the first tier: using the read-access command to retrieve the at least one data element from the first tier; obtaining, by a driver associated with the second tier, a write-access command that complies with the addressing scheme of the second tier, using the second write-access command to associate the unique reference name with at least one physical location on the second tier, and storing the data element at the associated at least one physical location on the second tier.

Storing the at least one data element on the selected tier may include: searching the selected storage tier for a data element that corresponds to the unique reference name. If such a data element may not be located on the selected storage tier, then embodiments may store the at least one data element on the selected tier and respond to the write-access request with a first message (e.g., a notification message of successful storage). If such a data element may be located on the selected storage tier, then embodiments may respond to the write-access request with a second message (e.g., a notification message of unsuccessful storage, due to duplication of data), without storing the at least one data element on the selected tier.

Embodiments of the present invention may include a system for managing a plurality of storage tiers. Embodiments of the system may include: a non-transitory memory device, wherein modules of instruction code may be stored, and a processor associated with the memory device, and configured to execute the modules of instruction code. Upon execution of the modules of instruction code, the processor may be further configured to perform at least one method of managing a plurality of storage tiers, as elaborated herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
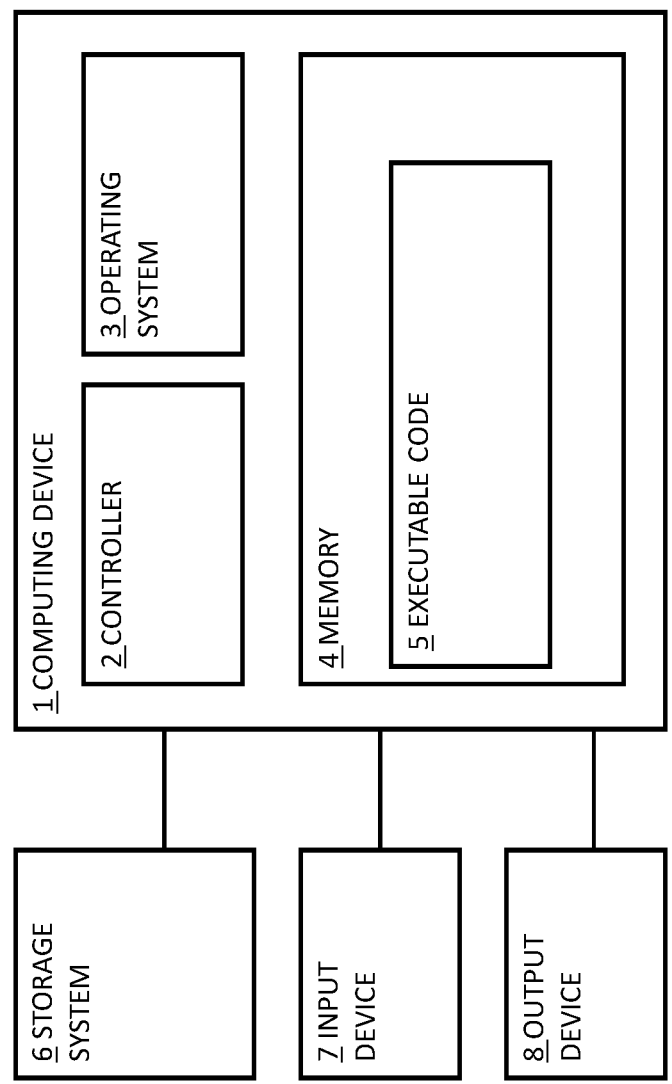
FIG. 1 is a block diagram, depicting a computing device, which may be included in a system for management of multi-tier storage, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for management of multi-tier computer or digital data storage. The term 'tier' is used herein to refer to one or more storage devices or media. As commonly referred in the art, a "multi-tiered" storage system may refer herein to a system that may include at least two storage devices of one or more media types (e.g. Non-Volatile Memory devices (NVMs), Solid State Drives (SSDs), Hard Disk Drives (HDDs), Compact Disks (CDs), cloud-based storage systems and the like). For example, a multi-tier data storage system may implement a layered storage model and may include a first data storage unit for storing recently loaded data files and a second data storage unit coupled to the first data storage unit for storing data files residing on the first data storage unit for more than a predetermined period of time.

Embodiments of the present invention include a system and a method of managing multi-tier storage. An embodiment may include addressing data on one or more tiers in a manner that is independent of any specific addressing scheme, and thus enabling data management operations to be agnostic of tier-specific structure and addressing scheme. Moreover, tier-independent addressing as disclosed herein may facilitate introduction of new tiers to the multi-tier storage, that may include new media types and may employ novel addressing schemes, without affecting existing data management functions or references.

Reference is now made to FIG. 1, which is a block diagram depicting a computing device, which may be included within an embodiment of a system for management of multi-tier storage, according to some embodiments.

Computing device 1 may include a controller 2 that may be, for example, a central processing unit (CPU) processor, a chip or any suitable computing or computational device, an operating system 3, a memory 4, executable code 5, a storage module 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may implement methods of management of multi-tier storage, as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage 6 and may be loaded from storage 6 into memory 120 where it may be processed by controller 2. In some embodiments, some of the components shown in FIG. 1 may be omitted. For example, memory 4 may be a non-volatile memory having the storage capacity of storage 6. Accordingly, although shown as a separate component, storage 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
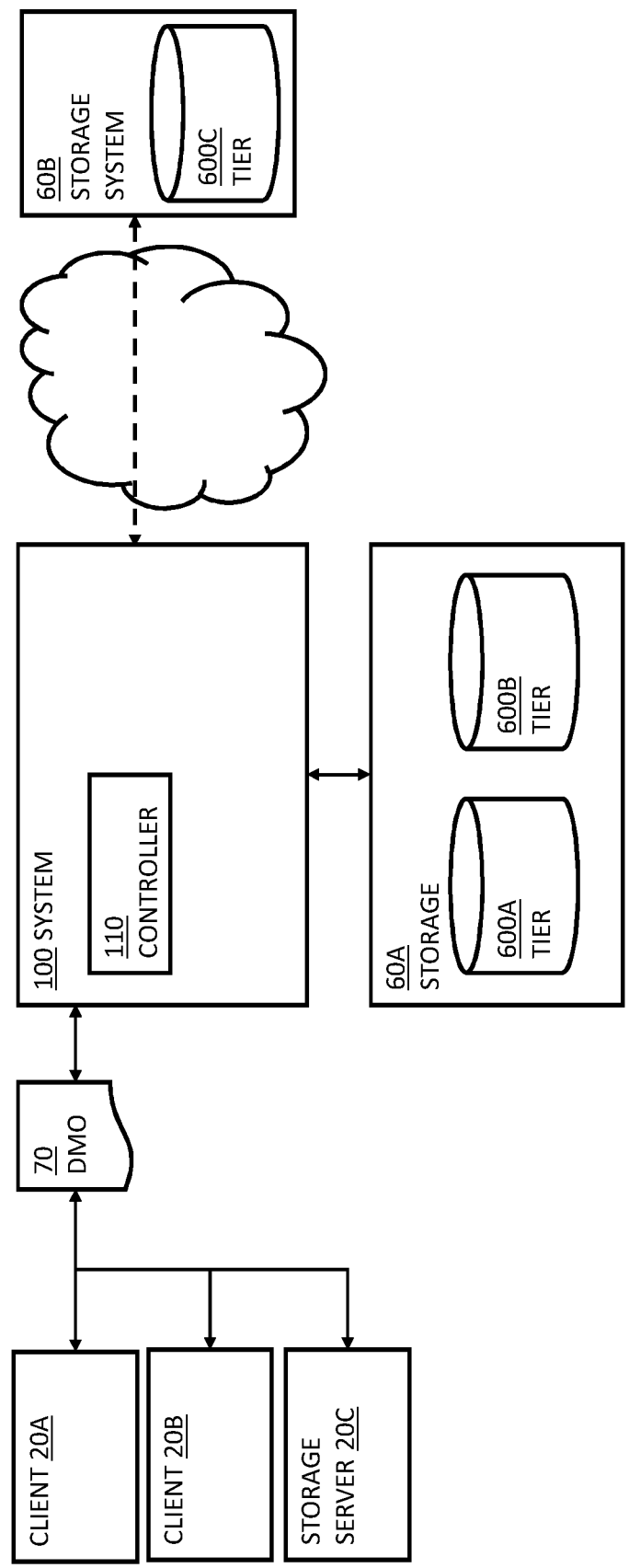
FIG. 2 is a block diagram, depicting a system for management of multi-tier storage, according to some embodiments.

Reference is now made to FIG. 2, which is a block diagram, depicting a system 100 for management of multi-tier storage, according to some embodiments. System 100 may include or may be implemented by one or more computing devices (e.g. element 1 of FIG. 1) and may include or be associated with one or more storage modules 60 (e.g. 60A and 60B). System 100 may be communicatively connected (e.g. by data links, busses or networks) to the one or more storage modules 60 either locally (e.g. via a Peripheral Component Interconnect Express (PCIe) bus) or remotely (e.g. over a Wide Area Network (WAN)). Each storage module 60 (e.g. 60A. 60B) may include one or more storage tiers 600 (e.g. 600-A, 600-B and 600-C).

In some embodiments, at least two tiers may differ by at least one characteristic, including for example: a storage media type (e.g. SSD, HDD, CD, NVM, Flash, etc.), an addressing scheme (e.g. a block storage addressing scheme, an object storage addressing scheme, a file storage addressing scheme, etc.), a size (e.g., in kilobytes (kB)) of physical storage blocks, an underlying physical erase unit and the like, as known to persons skilled in the art. In some embodiments, some or all tiers may have similar or identical characteristics.

System 100 may be communicatively connected to one or more computing devices 20 (e.g., 20A, 20B, 20C), such as client computers and/or storage servers, that may be or may include one or more computing devices such as element 1 of FIG. 1. In the example depicted in FIG. 2, the one or more computing devices 20 are manifested as one or more client computers 20 (e.g., 20A, 20B) or storage servers 20C that may be connected to system 100 either locally (e.g., via a PCIe bus and the like) or remotely (e.g. over a WAN, a cellular data network, and the like).

Computing devices 20 may require access (e.g., read access, write access, etc.) to at least one storage tier 600, to perform Data Manipulation Operations (DMOs) 70 thereon. The term DMO 70 may be used herein to refer to any operation of a computing device 20 on data that may be stored on a storage tier 600, including for example, storage of data, retrieval of data, copying data, read, write and the like.

It is to be noted that according the context, the term DMO may refer to flow of data in one or both directions, e.g., from a computing device 20 to a storage tier 600 and vice versa. For example, data manipulation operations may include a write-access command, a write-access acknowledgement, a read-access command, a read-access acknowledgement, an erase command, a transfer command and/or a copy command among a plurality of storage tiers, and the like.

System 100 may include one or more controllers or processors 110 (e.g., such as element 2 of FIG. 1), configured to receive the one or more DMOs from one or more computing devices 20, process the one or more DMOs 70, and execute the processed DMOs 70 in relation to the one or more storage tiers 600, as elaborated herein.

Figure 3:
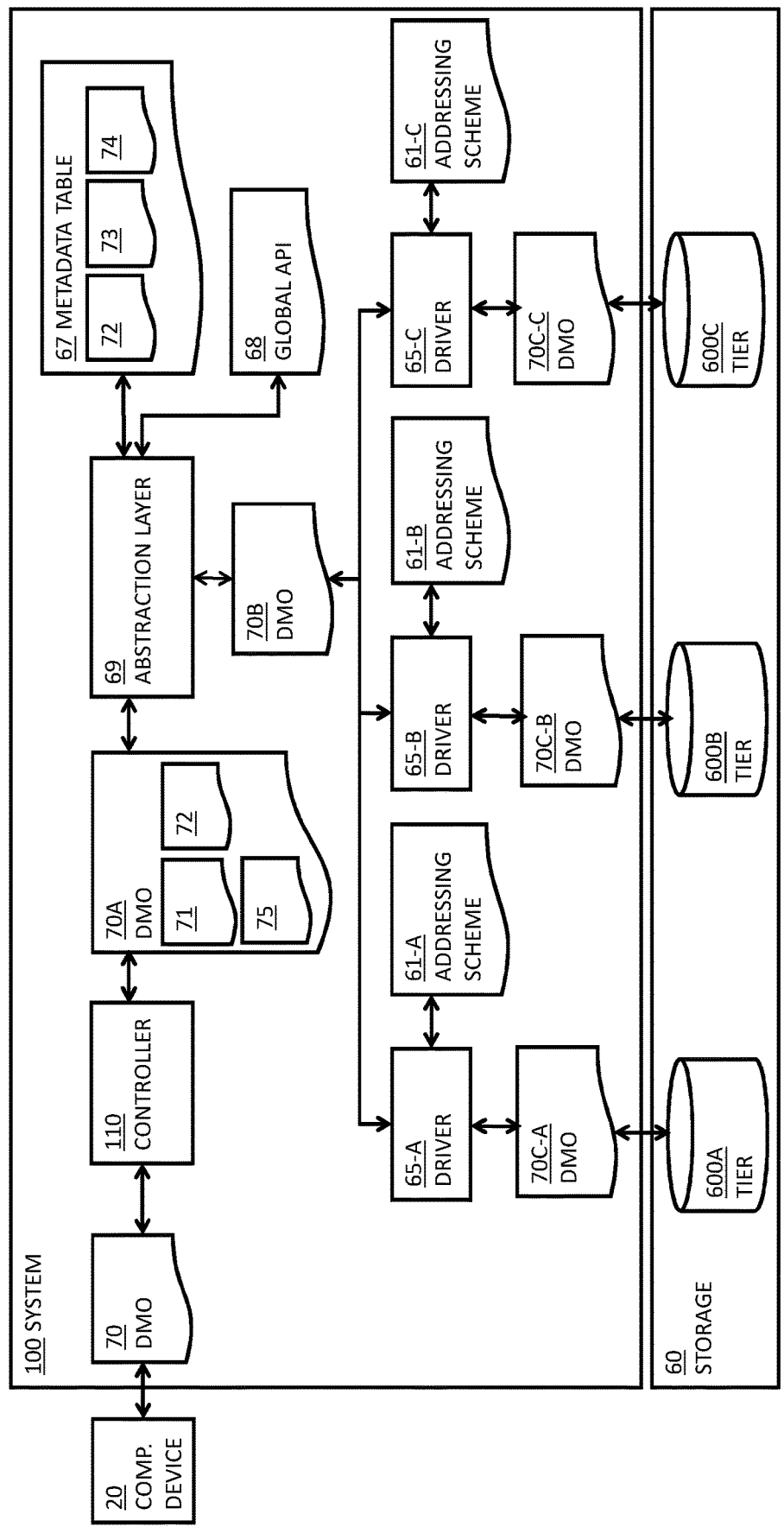
FIG. 3 is a block diagram, depicting components of a system for management of multi-tier storage, according to some embodiments.

Reference is now made to FIG. 3, which is a block diagram, depicting modules of a system 100 for management of multi-tier storage, according to some embodiments. The modules of system 100 may include for example, one or more of an abstraction layer 69 and a driver 65 (e.g., 65A, 65B, and 65C), and may be implemented as software modules (e.g., as software processes executed by the at least one controller or processor 110) or as hardware modules, or as any combination thereof.

As elaborated in relation to FIG. 2, system 100 may interface at least one storage module 60 that may include one or more (e.g., a plurality) of storage tiers 600 (e.g. 600A, 600B and 600C), and one or more computing devices 20, such as storage servers or client computers.

System 100 may receive (e.g., from the one or more computing devices 20) one or more DMOs 70 and process the one or more DMOs 70 in relation to specific storage tiers 600, as elaborated herein. Different stages of processing of DMOs by system 100 are manifested in FIG. 3 as denominations of DMO 70 (e.g., 70A. 70B, 70C, etc.)

As shown in FIG. 3, each storage tier 600 may require an appropriate addressing scheme 61 (e.g. 61-A, 61-B and 61-C, respectively) to perform operations of data storage and data retrieval therefrom.

For example, a first storage tier 600 (e.g. 600A) may be or may include an HDD storage device, and may require a first storage addressing scheme 61 (e.g. 61-A), such as a file storage scheme, where data is stored and retrieved according to metadata such as a path string, as known in the art.

In another example, a second storage tier 600 (e.g. 600B) may be or may include an NVM flash storage device, and may require a second storage addressing scheme 61 (e.g. 61-B), such as a block storage scheme, where data is stored and retrieved as blocks, as known in the art.

In another example, a third storage tier 600 (e.g. 600C) may be or may include an SSD storage device, and may require a third storage addressing scheme 61 (e.g. 61-C), such as an object storage scheme (e.g., a key-value storage scheme), where data is stored and retrieved according to metadata (e.g., the key) associated with the content of the stored object(s), as known in the art. For example, the stored data object may be or may include at least one entry of a database, stored on a storage system 60 (e.g., elements 60A, 60B of FIG. 2). An element of metadata may be or may include a key, a pointer or a reference to the at least one entry of the stored database and a respective content of a stored object may be a value of one or more data elements (e.g., a content of a variable) that is or is included in the at least one entry.

System 100 may be adapted to process DMO 70 so as to provide an interface for external computing devices 20, that may be agnostic to tier-specific structures and addressing schemes. System 100 may do so by way of abstracting data that may be included in DMO 70, as explained herein.

As shown in FIG. 3, system 100 may include an abstraction layer 69, adapted to receive at least one DMO 70 command (e.g., a write-access command, including a data element for storage) from a computing device 20 such as a storage server (depicted as element 70) and/or from controller 110 (depicted as 70A). Abstraction layer 69 may compute or produce a metadata element, according to a content of the DMO command. The metadata element calculated or computed by abstraction layer 69 is herein referred to as a unique reference name 73. (E.g., unique within a system of an embodiment of the present invention.) Abstraction layer 69 may associate or link the DMO 70A command with the produced or computed unique reference name 73, as elaborated herein.

According to some embodiments, DMO 70A may include at least one data element 71 (e.g., a data object that may be included in a software process) for storage on at least one storage tier 600, and a logical address 72 associated with the at least one data element.

The at least one data element may, for example, be a data container or data structure, such as one or more entries in a database, a table, a variable structure and the like, that may be stored within one or more physical storage records on a storage device (e.g., a non-volatile memory device). The at least one data element may be stored, as known in the art as one or more data blocks, on physical storage units such as write-blocks or storage blocks, as commonly referred to in the art.

Abstraction layer 69 may receive DMO 70A (e.g. from computing device 20) and may compute or produce a metadata element such as a unique reference name 73 (typically unique with regard to a system of an embodiment of the present invention) based on the content of the at least one data element 71. Unique reference name 73 may for example, be obtained by applying a cryptographic function (e.g., a cyclic redundancy check (CRC) function or a cryptographic hash function) on the content of the data element, as known in the art.

Abstraction layer 69 may associate, by any form of association (e.g. by a table, a linked list, and the like) unique reference name 73 with the logical address 72. The association of unique reference name 73 with the logical address 72 may be utilized by system 100 to perform at least one data manipulation operation on at least one data element 71 (e.g. storage of the data element, retrieval of the data element, etc.), in a manner that is dissociated from the logical addressing 72 of data element 71.

For example, abstraction layer 69 may include or may be associated with a metadata table 67, configured to associate between at least one logical address 72 and a respective at least one unique reference name 73, as depicted in the example of Table 1:

TABLE 1

| Logical address (72) | Unique reference name (73) |
|---|---|
| 0x11111110 | 0x1212 |
| 0x1111111F | 0x2323 |
| 0x11111120 | 0x3434 |

Metadata table 67 may for example, be stored or maintained in a memory device or a storage device such as elements 4 and 6 of FIG. 1, respectively.

Abstraction layer 69 may dissociate between data element 71 and its respective logical address 72 by translating between computing device 20 and storage 60. For example, Abstraction layer 69 may (a) communicate at least one first communication, pertaining to at least one DMO (e.g., a read-access command) with computing device 20, using the logical address 72; (b) communicate at least one second communication, pertaining to the at least one DMO with at least one storage tier driver 65, using the unique reference name 73; and (c) translate (e.g., by metadata table 67) between the first and second communications, thus dissociating between the content of the data element 71 and the logical address 72, from the drivers 65 (and, ultimately the storage tiers 600) point-of-view. In other words, from the storage tier driver's 65 point of view, data element 71 (and specifically the content of data element 71) may be dissociated or disconnected from or unrelated to the data object's logical address 72 (e.g., as received from computing device 20 (e.g., elements 20A, 20B, 20C of FIG. 2))

In some embodiments, controller 110 may receive at least one DMO 70 including a write-access request for storage of a data element 71 on a selected storage tier. For example, controller 110 may receive the write-access request from a software process that may be executed by a controller (e.g., element 2 of FIG. 2) included in or associated with computing device 20. In another example, computing device 1 may receive the write-access request from an external source, such as a different computing device 1, e.g., via input device 7 of FIG. 1.

The at least one write-access request DMO 70 may include the content of the at least one data element 71 and a logical address 72 associated with the data element. According to some embodiments, the at least one write-access request may include a tier identifier (e.g., an ID number) of a tier 600 (e.g., 600A, 600B, 600C), to indicate a selected or preferred tier 600 for storage.

In some embodiments, logical address 72 may include at least one of: a data element identifier (e.g. file identifier, a global application address of a data object, a volume identifier and the like) and an offset within a data element. For example, logical address 72 may include a volume identifier and an offset to a volume block within the volume associated with a volume identifier).

Abstraction layer 69 may compute a unique reference name 73 based on the content of the at least one data element 71. For example, abstraction layer 69 may apply a hashing (e.g. a secure hash function, a Cyclic Redundancy Check (CRC) function, and the like) on the content of the at least one data element to obtain the unique reference name 73. Abstraction layer 69 may store the unique reference name (e.g., on metadata table 67), and associate between the unique reference name and the logical address as explained herein, in relation to Table 1.

Abstraction layer 69 may continuously maintain metadata table 71, to correctly associate unique reference names 73 with the logical addresses. For example, when a data element 71 is rewritten or updated, abstraction layer 69 may recalculate the unique reference name 73 of the rewritten data element, and update metadata table 71 accordingly.

In some embodiments, the at least one data element 71 may be a data container (e.g., a structure, a table, and the like), including a plurality of data elements, and the logical address 72 associated with the data container may include at least one of: a container identifier (e.g., a reference or a pointer to the container) and an address offset to a data element within the data container. Abstraction layer 69 may compute the unique reference name per one or more data elements within the container, or per each of the data elements within the container.

As shown in FIG. 3, embodiments may include or use a global Application Programming Interface (API) 68 that may implement a global identifier and/or content interface between computing device 20 and the storage tiers 600 of storage system 60.

API 68 may be global in a sense that it may be common to all storage tiers 600 (e.g., 600A, 600B. 600C) of storage system 60, regardless of their specific characteristics. In other words, global API 68 may be agnostic to at least one characteristic of the plurality of storage tiers. This may enable data to be freely moved between computing device 20 and storage tiers 600 and/or among different storage tiers 600 using a common interface while keeping high level constructs such as data objects, volumes and files of computing device 20 logically intact (e.g., without need to perform translation or adaptation thereto, to accommodate tier-specific storage characteristics).

According to some embodiments, controller 110 may receive (e.g., from computing device 20) at least one DMO command 70 (e.g., a read-access command), may include at least one logical address 72 of at least one data element Abstraction layer 69 may obtain (e.g., from table 67) a unique reference name 73 associated with logical address 72 and associate the unique reference name 73 with the logical address 72.

Abstraction layer 69 may use a global API 68 to generate a global DMO command 70B that may include the unique reference name 73 and may be dissociated from (e.g., not include) the logical address 72 of received DMO 70.

The term 'global' may be used herein, in relation to DMOs, to refer to a format of DMOs that may be indifferent, or non-specific to any characteristic of a type of storage media or storage tier. In some embodiments, the global DMO 70B command may include or may be implemented as one or more global Application Programming Interface (API) 68 functions and may be agnostic or indifferent to specific characteristics of the target storage tier. For example, the one or more global API 68 functions may be indifferent to or lack information pertaining to characteristics such as: the storage media's type, storage media's size, the storage media's addressing scheme and size of physical storage blocks on the storage media. In other words, generating global DMO 70B may be done by a global API 68, or one or more global API functions that may be agnostic to at least one characteristic of the one or more (e.g., plurality) of underlying storage tiers 600 (e.g. 600A, 600B and 600C).

According to some embodiments, one or more of storage tiers 600 (e.g. 600A, 600B and 600C) may be associated with at least one respective appropriate or dedicated driver module 65 (e.g. 65-A, 65-B and 65-C, respectively). The at least one driver module 65 (e.g. 65-A) may be configured to receive at least one global DMO command 70B (e.g., a write-access command, a read-access command, etc.) and perform the command (e.g., the write operation, the read operation, etc.) on a respective target storage tier (e.g. 600A). The at least one driver module 65 (e.g. 65-A) may translate or customize, convert or adapt global DMO command 70B to a tier-specific DMO format (e.g., specific to storage tier 70C-A, 70C-B or 70C-C), according to characteristics of the respective storage tier, to apply, implement or execute the DMO (e.g., perform the write command or the read command) on the respective storage tier.

The at least one appropriate or dedicated driver module 65 may translate or customize, convert or adapt the DMO command according to at least one property or characteristic of the respective storage tier, to facilitate the application of the DMO on the respective target storage tier. The at least one property or characteristic may include for example, a storage media type, an addressing scheme, a size of physical storage blocks, an underlying physical erase unit and the like, as elaborated herein.

In some embodiments, dedicated driver module 65 may receive a request to store data on a respective storage tier, that is adapted to be accessed by a respective addressing scheme and dedicated driver module 65 may adjust or customize the global DMO command 70B according to the storage tier's addressing scheme.

For example, if an underlying storage tier 600 is a file storage tier, adapted to store a received data element (e.g., a value of a variable) as a file, dedicated driver module 65 may translate, adjust or customize global DMO command 70B to include one or more file-related metadata elements (e.g., a file name, a volume name, one or more file access permissions, a file path, a parent directory, and the like). Dedicated driver module 65 may store the received data element as a file (e.g., in conjunction with the respective file-related metadata elements). Dedicated driver module 65 may subsequently serve data access requests from computing device 20 (e.g., perform data read commands) by addressing the underlying storage tier 600 according to the file path, file name and file access permissions, as known in the art.

In another example, if an underlying storage tier 600 is a block storage tier, adapted to store a received data element (e.g., a value of a database entry) as one or more data blocks, dedicated driver module 65 may translate, adjust or customize global DMO command 70B to fragment the received data element according to the underlying storage block size, and/or include one or more block-related metadata elements, such as the size of used blocks, the number of used blocks, etc. Dedicated driver module 65 may store the received data element as one or more physical data blocks within tier 600 according to the block fragmentation (e.g., to match a size of underlying physical storage blocks). Dedicated driver module 65 may subsequently serve data access requests from computing device 20 (e.g., perform data read commands) by addressing the underlying storage tier 600 according to the stored blocks, as known in the art.

In another example, dedicated driver module 65 may receive a request to store data on a block storage tier that may be adapted to be accessed by a respective addressing scheme (e.g., a block storage scheme). Dedicated driver module 65 may adjust or customize the global DMO command according to specific properties of the storage tier 600, to perform write commands according to the storage tier's 600 native block size.

For example, one or more dedicated driver modules 65 (e.g., 65A, 65B) may be employed to copy or transfer one or more data objects from a first block data storage tier 600 (e.g., 600A) characterized by a first native, physical data block size to a second block data storage tier 600 (e.g., 600B) characterized by a second native, physical data block size. In this condition, a first dedicated driver module (e.g., 65A) may access underlying data block storage tier (e.g., 600A) and read one or more data objects from respective one or more data blocks as a tier-specific DMO 70C (e.g., DMO 70C-A of FIG. 3). First dedicated driver module (e.g., 65A) may translate tier-specific DMO 70C to a global DMO 70B format as a data object that that may be agnostic to the size of the first, inherent physical storage blocks. Second dedicated driver module (e.g., 65B) may translate, adjust or customize global DMO 70B so as to fragment the data object of global DMO 70B, so as to match the size of a native, physical storage block of underlying storage tier 600B, and may store the data object in the translated format on storage tier 600B.

According to some embodiments, at least one driver 65 (e.g., 65A) may customize the global DMO command 70B according to at least one characteristic (e.g., addressing scheme, block size, storage tier type, storage tier size, etc.) of a specific storage tier (e.g., 60A) of the plurality of storage tiers 60 to obtain a tier-specific DMO command (e.g., 70C-A). The at least one driver 65 (e.g., 65A) may implement, execute or apply the tier-specific DMO (e.g., 70C-A) command (e.g., a read-access command) on the specific storage tier (e.g., 600A), as known in the art, to for example, erase, read or write data.

For example, in a case of a read-access command, the tier-specific DMO command 70C (e.g., 70C-A) may include a unique reference name 73. The at least one driver 65 (e.g., 65A) may be configured to search for the stored data object 71 on the respective storage tier (e.g., 600A) according to the unique reference name 73, and retrieve data stored on the storage tier, in a process known in the art as "content-based data retrieval" or "content based addressing". The format of the retrieved data (e.g., on DMO 70C-A) may be dependent upon the characteristics (e.g., storage block size) of the respective storage tier (e.g., 600A). The respective driver (e.g., 65A) may translate the tier-specific DMO 70C (e.g., 70C-A, 70C-B, 70C-C) format to a global DMO format 70B, and abstraction layer 69 may return the retrieved data with the respective logical address 72 to computing device 20.

In another example, dedicated driver 65 may customize the global DMO command 70B according to at least one characteristic of the underlying storage tier's media type. For example, as known to persons skilled in the art, non-volatile memory (NVM) storage devices are commonly characterized by a minimal memory space that may be erased by a single operation. This memory space is commonly referred to as an "erase block" in the art. Embodiments of the invention may receive at least one DMO command 70A (e.g., from computing device 20) that may include a request to erase one or more data objects 71 (e.g., one or more variables, files etc.) form storage. As elaborated herein, abstraction layer 69 may transform DMO command 70A to a global DMO command 70B, to dissociate the content of the at least one data object 71 from its respective logical address 72. Dedicated driver 65 (e.g., 65A) may be configured or customize global DMO command 70B, to produce a tier-specific DMO 70C-A erasure command that may comply with the minimal erase-block constraint of underlying storage tier 600A.

In another example, dedicated driver 65 may customize the global DMO command 70B according to the underlying storage media size. For example, assume that storage tier 600 (e.g., 600A) includes a plurality (e.g., two) storage devices (e.g., SSD drives), having a different size (e.g., a different storage space). Also assume that global DMO 70B includes a request to store at least one data object on storage tier 600. Dedicated driver 65 may be configured to customize at least one global DMO 70B and produce a tier-specific DMO 70C that may include a selection of one storage devices of the plurality of storage devices pertinent to tier 600 (e.g., so as to perform load balancing among storage devices of tier 600).

According to some embodiments, at least one driver module 65 may be implemented as a hardware component and may be included in or communicatively connected (e.g., via a communication bus, via a Local Area Network (LAN), via WAN, etc.) to a respective at least one storage tier 600.

Additionally, or alternately, at least one driver module 65 may be implemented as a software process and may be executed by at least one controller or processor 110.

Additionally, or alternately, at least one driver module 65 may be implemented as a combination of a hardware component included in or communicatively connected to at least one storage tier 600 and a software process, executed by at least on controller or processor 110.

In the direction of data flow from computing device 20 to the one or more storage tiers 600, abstraction layer 69 may use global API 68 to generate a global DMO command 70B from DMO command 70A.

For example, DMO command 70A may be a write-access command, including a logical address 72 and at least one respective data element 71 to be written to a storage tier 600. Global DMO write-access command 70B may include, for example, a respective unique reference name 73 that may be obtained or calculated by abstraction layer 69, as elaborated herein, and the content or value of the at least one data element 71. Global DMO 70B may be agnostic or indifferent to the properties and characteristics of the selected target storage tier 600 (e.g., 600A).

In another example, DMO command 70A may be a read-access command and may include a logical address. Global DMO read-access command 70B may include, for example, a respective unique reference name (e.g., according to metadata table 71, as explained herein), and may also be agnostic or indifferent to the properties and characteristics of the selected target storage tier 600 (e.g., 600A).

Driver 65 (e.g., 65A) associated with the selected tier 600 (e.g., 600A) may customize global DMO 70B (e.g., global write-access command, global read-access command) according to an addressing scheme of the selected tier (e.g., 600A), to obtain a tier-specific DMO command (e.g., element 70C-A, respectively).

For example, if the selected tier (e.g., 600A) uses a Key/Value storage addressing scheme, the respective driver 65 (e.g., 65A) may natively address the selected tier (e.g., 600A) by using the opaque, unique reference name as a key, in a tier-specific DMO command (e.g., 70C-A).

In another example, if the selected tier 60 (e.g., 600B) uses a block addressing scheme, the respective driver 65 (e.g., 65B) may maintain a metadata table (e.g., as part of metadata 67) that may translate between the unique reference name 73 and a physical block addresses 74, as depicted below in Table 2, and address the selected tier 600 (e.g., 60B) by a tier-specific DMO command (e.g., 70C-B).

TABLE 2

| Physical address (74) | Unique reference name (73) |
|---|---|
| 0x1110 | 0x1212 |
| 0x111F | 0x2323 |
| 0x1120 | 0x3434 |

Driver 65B may use the tier-specific write-access DMO (e.g., 70C-B) to associate or map the unique reference name 73 with at least one physical address 74 or location on the selected tier (e.g., 600B), and store the at least one data element at the associated at least one physical location 74 on the selected target tier.

According to some embodiments, in a complementary manner to the process of data storage as elaborated herein, system 100 may be configured to retrieve at least one data element from a selected tier to computing device 20.

In the direction of data flow from the one or more storage tiers 60 towards computing device 20 (e.g., a read-access response, a write-access acknowledgement, and the like), driver 65 may receive at least one tier-specific DMO 70C (e.g., 70C-A, 70C-B, 70C-C) and use global API 68 to externalize the DMO, and create a respective at least one global DMO 70B, as explained herein.

According to some embodiments, controller 110 may receive at least one DMO 70A including a read-access request. The read-access request may include at least one logical address 72. Additionally, the read-access request may further include a tier identifier 75 of a selected tier (e.g., 600A, 600B, 600C). For example, controller 110 may receive a logical address 72 associated with a data element, that may include at least one of: a data element identifier (e.g. a volume identifier) and an offset within a data element (e.g. an offset to a volume block within the volume associated with the volume identifier).

Abstraction layer 69 may obtain (e.g., from metadata table 71) a unique reference name 73 that may be associated with the at least one logical address 72. The unique reference name 73 may be computed based on the content of the at least one data element and may be associated with the logical address 72 of the at least one data element 71 as part of the process of storing the data element 71 on the selected target tier, as explained herein.

Abstraction layer 69 may use global API 68 to generate a global DMO 70B, including a read-access command, based on the received at least one read-access request 70A. Global DMO 70B read-access command may, for example, include the unique reference name 73 associated with the at least one data element 71, and may be agnostic to the properties and characteristics of the selected target storage tier 600 (e.g., 600C).

Abstraction layer 69 may propagate global DMO 70B read-access command to a driver 65 (e.g., 65C) according to the storage tier identifier 75 associated with the selected target tier 600 (e.g., 600C). Driver 65 (e.g., 65C) may customize the global DMO 70B read-access command according to the addressing scheme of the selected tier (e.g., 600C), to obtain at least one tier-specific DMO 70C (e.g., 70C-C) read-access command.

Pertaining to the example of the key/value storage scheme elaborated in relation to data storage operations, driver 65 (e.g., 65C) may facilitate retrieval of a data element from the selected target storage tier (e.g., 600C) by addressing, within the tier-specific DMO 70C read-access command, the required data element in the selected tier 60 (e.g., 600C) by using the opaque, unique reference name as a key.

In some embodiments, driver 65 may be further configured to retrieve at least one data element from a key/value storage according to a hierarchical data structure. For example, controller 110 may receive at least one DMO 70 including a request to read at least one data element associated with a parent-key. Driver 65 may be configured to consequently retrieve the value of a plurality of data elements, that may be associated with one or more children keys, as known in the art.

Driver 65 (e.g., 65C) may use the tier-specific DMO 70C read-access command to perform a content-based data retrieval as known in the art, including (a) performing a search for a data element 71 that corresponds to unique reference name 73 on the selected storage tier (e.g., 600C) and (b) retrieve the at least one data element 71 or a reference thereto from the selected tier (e.g., 600C).

In a complementary manner to that described in relation to data storage operations, driver 65 may use or externalize global API 68 to implement a common identifier or a content interface that may enable data to be freely moved and/or copied between different tiers using a common interface, while keeping high level constructs (e.g. data objects, volumes and files of computing device 20) logically intact (e.g., without need to perform translation or adaptation thereto, to accommodate tier-specific storage characteristics).

According to some embodiments, system 100 may be configured to transfer or copy at least one data element between storage tiers that may differ by one or more parameter or characteristic (e.g. a size of native storage bocks, an addressing scheme and the like) without affecting DMOs associated with high level constructs.

For example, computing device 1 may receive (e.g. from client 20, such as element 20A, 20B, 20C of FIG. 2) a DMO 70A that may include a transfer request of a data element from a first storage tier (e.g., 600A) to a second storage tier (e.g., 600B). The DMO 70A transfer request may include at least one logical address 72 associated with the data element, a tier identifier 75 of the first tier (e.g., 600A) and a tier identifier 75' of the second tier (e.g., 60B).

Abstraction layer 69 may obtain (e.g. from metadata table 67) a unique reference name 73 associated with the at least one logical address 72 of the data element stored on the first storage tier (e.g., 600A).

A first driver 65 (e.g., 65A) associated with the first storage tier (e.g., 600A) may produce a read-access command DMO (e.g., 70C-A) that may comply or may be customized according to at least one characteristic or parameter (e.g. an addressing scheme) of the first tier (e.g., 600A), as explained herein in relation to data retrieval from at least one storage tier. The first driver 65 may utilize the tier-specific read-access command DMO (e.g., 70C-A) to retrieve the at least one data element from the first tier (e.g., 600A), as known in the art.

A second driver 65 (e.g., 65B) associated with the second tier (e.g., 600B) may produce a tier-specific write-access command DMO (e.g., 70C-B) that may comply or may be customized according to at least one characteristic or parameter (e.g. size of physical storage blocks) of the second tier (e.g., 600B), as explained above in relation to data storage at least one data element on a selected storage tier. The second driver (e.g., 65B) may use the second write-access command (e.g., 70C-B) to associate the unique reference name 73 with at least one physical location 74 on the second tier (e.g., 60B) and store the data element at the associated at least one physical location 74, as known in the art, thus completing a copy of the data element 71 from the first tier (e.g., 600A) to the second (e.g., 600B).

In some embodiments, first driver 65 (e.g., 65A) may further produce a tier-specific erase command DMO (e.g., 70C-A), after the copy operation, to purge the memory space occupied by the data element 71 on the first tier, and thus perform an operation of transfer of data, rather than a copy operation.

As elaborated above, the transfer and/or translation of the at least one data element from the first storage tier (e.g., 600A) to an at least one second storage tier (e.g., 600B) does not in some embodiments require a change in a logical address 72 (e.g. an application address) that may be associated with the at least one data element 71, and does not in some embodiments require a modification of the unique reference name 73, and hence has no impact on DMOs that may be applied by computing device 20 (e.g., by a user or an application executed thereon) on the at least one data element.

In a complementary manner, the combination of using global API 68 and a unique reference name 73 as explained herein may facilitate introduction and/or modification of at least one storage tier (e.g. one or more storage devices), that may have a novel or different storage characteristics or properties, without changing the global API 68, and thus without requiring any modification to an interface between the tiers included in system 100 and an associated computing device 20.

For example, system 100 may be required to move (e.g., as part of an upgrade or a backup process) stored data, that may include at least one data element 71 from a first storage tier or media, that may be configured to allocate data in large quantities, (e.g. data object stores) to a second storage tier or media that may use fine-grained data blocks (e.g. block storage). System 10 may implement such transfer of data by cutting the large data quantities that may be compliant with the first media type to a plurality of smaller data segments that may be compliant with the second media type.

In a complementary manner, system 10 may implement an opposite transfer of data (e.g., from the second storage tier to the first storage tier) by aggregating a plurality of data segments into a single data quantity, that may be compliant with the addressing scheme of the first storage media.

According to some embodiments, system 100 may be configured to deduplicate storage of at least one data element 71 on one or more storage tiers. For example, controller 110 may receive at least one data element for storage and produce a respective write-access command DMO 70A. Abstraction layer 69 may produce at least one respective unique reference name 73 for the at least one data element 71 as elaborated herein. Controller 110 may perform a search on one or more storage tiers (e.g. on one or more predefined storage tiers that may have been selected via input device 7 of FIG. 1) for a data element 71 that may correspond with the unique reference name 73. Controller 110 may subsequently only store the data element if the unique reference name 73 was not found, thus avoiding duplication. For example:

If a data element 71 that corresponds to the unique reference name is not located on the selected storage tier, then a respective driver 65 may store the at least one data element on the selected tier, and controller 110 may respond (e.g., to computing device 20) to the write-access request with a first message (e.g. a storage success message).

If a data element 71 is located on the selected storage tier, controller 110 may respond (e.g., to computing device 20) to the write-access request with a second message (e.g., storage failure message), without storing the at least one data element on the selected tier.

According to some embodiments, system 100 may be configured to deduplicate storage of at least one data element 71 within a storage tier, such that multiple copies of the same data may only be stored once. The single copy of stored data may then be referenced by multiple high-level constructs (e.g. files and applications associated with one or more users and/or computing devices, such as elements 20A, 20B, 20C of FIG. 2).

The granularity of such deduplication may vary according to at least one parameter or characteristic of a storage tier. For example:

a first tier may utilize fixed tier-wide storage size for every data object Controller 110 may consequently implement deduplication in relation to the entire object storage size.

a second tier may be configured to store data objects that may vary in size in a respective variable number of basic blocks of a standard size. Controller 110 may consequently implement deduplication in relation to the basic blocks of standard size.

In some embodiment, controller 110 may be configured to search (e.g. as part of a background process) for data that may be duplicated and stored on two or more physical data blocks, such as a first physical storage block and at least one second physical storage block. When such duplication is found, driver 65 of the respective storage tier may be configured to deallocate a storage space of the at least one second physical storage block and controller 110 may update metadata table 67 to associate the unique reference name 73 of the respective data element 71 with the first physical storage block on the selected tier.

Figure 4:
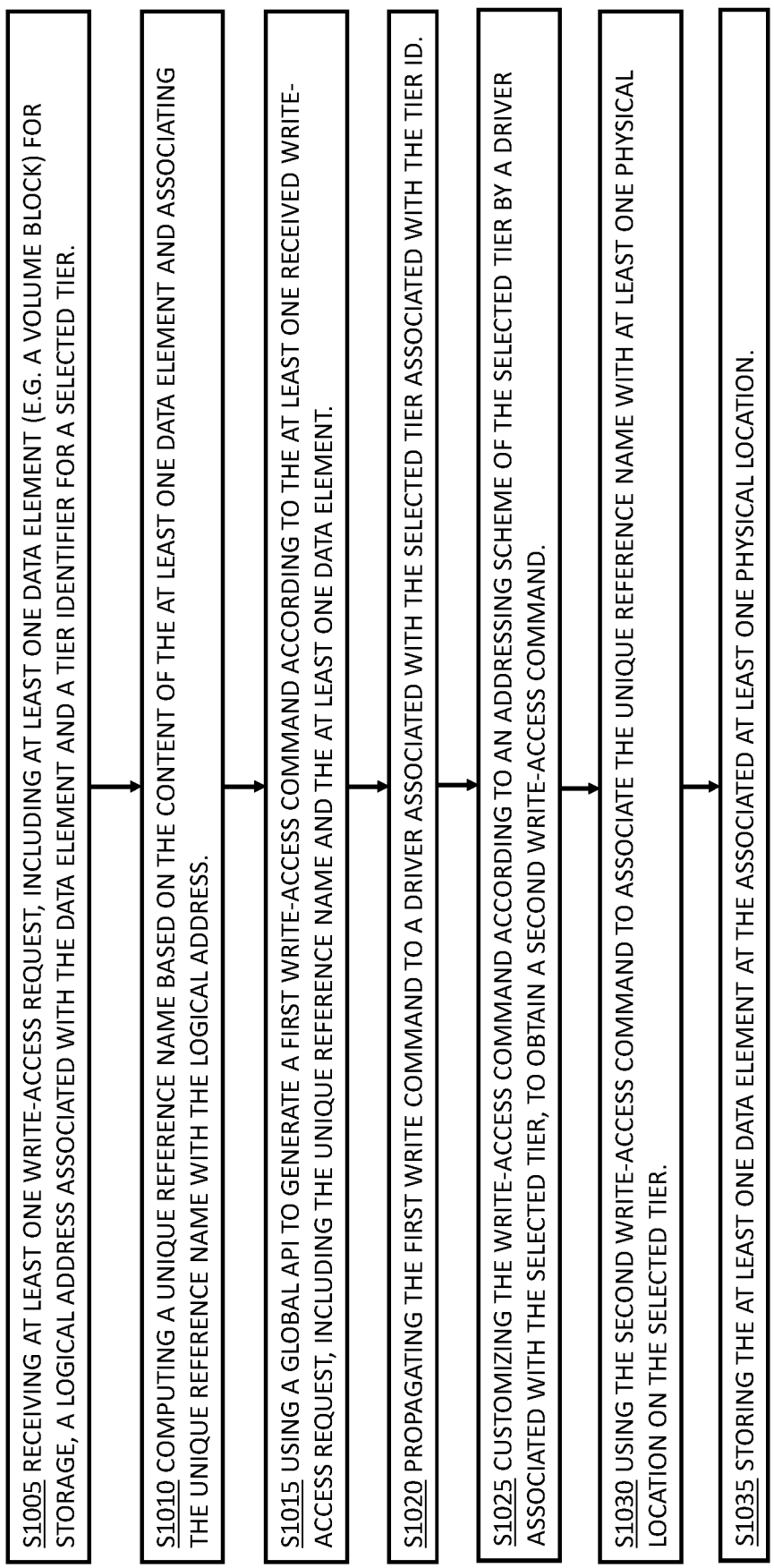
FIG. 4 is a flow diagram, depicting a method of storing at least one data element by a system for management of multi-tier storage, according to some embodiments.

Reference is now made to FIG. 4, which is a flow diagram, depicting a method of storing at least one data element by a system for management of multi-tier storage, according to some embodiments.

As shown in step S1005, at least one processor or controller (e.g., controller 2 of FIG. 1) may receive (e.g. from a user or an application executed on a computing device, such as elements 20 of FIG. 2) at least one DMO 70 (such as a write-access request) that may include for example, at least one data element 71 (e.g. a volume block) for storage, a logical address 72 associated with the data element and a tier identifier 75 for a selected tier.

As shown in step S1010, controller 2 may compute a unique reference name 73 based on the content of the at least one data element 41. (E.g., unique within a system according to one embodiment.) For example, controller 2 may apply a hash function (e.g. a secure hash, a CRC function and the like) on the content of the at least one data element to produce or calculate the unique reference name 73.

Controller 2 may associate unique reference name 73 with the logical address (e.g. by a metadata table 67, as elaborated herein), and thus facilitate a global reference (e.g. a tier-independent reference) to the at least one data element 71.

As shown in step S1015, controller 2 may use a global API 68 to generate a first, global DMO 70B (e.g., a write-access command), based on the at least one received DMO 70 (e.g., a write-access request, received from computing device 20). For example, the first, global DMO 70B may include at least one of the unique reference name 73 (computed according to the content of the at least one data object 71, as explained herein) and the content of the at least one data element 71. The first DMO 70B may be global in a sense that it may be agnostic to one or more characteristics of subsequent storage tiers 600.

As shown in steps S1020 and S1025, controller 2 may propagate the first, global DMO 70B (e.g., the global write command) to a driver (e.g., elements 65 of FIG. 3) associated with the selected tier (e.g., corresponding to the tier identification 75). Driver 65 may customize the write-access command according to at least one property or characteristic (e.g. an addressing scheme, a size of physical data blocks) of the selected tier, as explained herein in relation to FIG. 3, to obtain a second DMO 70C (e.g., a second write-access command) that is customized according to the properties and/or characteristics of the selected tier.

As shown in step S1030 and S1035, in a condition where the DMO is a write access command, driver 65 may use second DMO 70C (e.g., the tier-specific write-access command) to associate (e.g., via metadata table 67) the unique reference name 73 with at least one physical location or address 74 on the selected tier 600, and store the at least one data element 71 at the associated at least one physical location 74, as known in the art.

Figure 5:
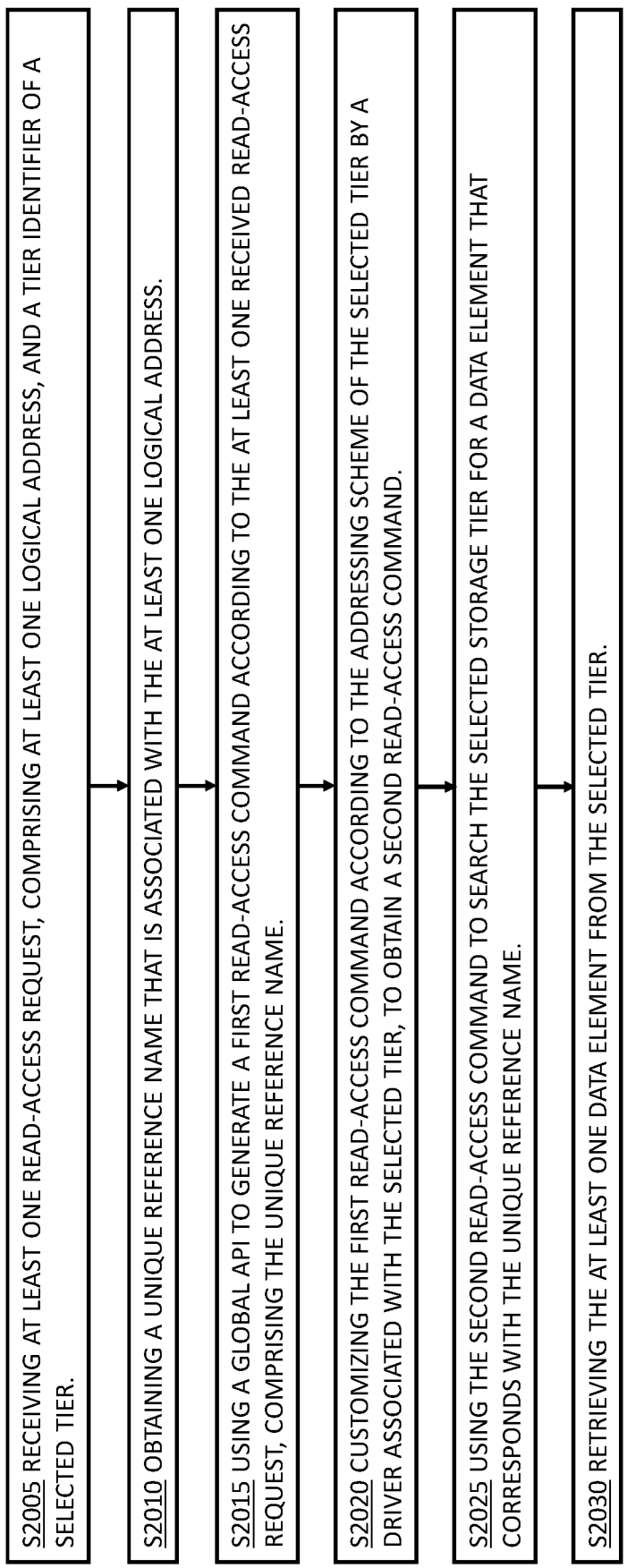
FIG. 5 is a flow diagram, depicting a method of retrieving at least one data element by a system for management of multi-tier storage, according to some embodiments.

Reference is now made to FIG. 5, which is a flow diagram, depicting a method of retrieving at least one data element by a system for management of multi-tier storage, according to some embodiments.

As shown in step S2005, controller 2 may receive (e.g. from a user or an application executed on a computing device such as element 20 of FIG. 2) at least one DMO 70 (e.g., a read-access request). The at least one DMO 70 (e.g., the read-access request) may include at least one of a logical address 72, and a tier identifier 75 of a selected tier.

As shown in step S2010, controller 2 may obtain (e.g. from metadata table 67 of FIG. 3) a unique reference name 73 that may be associated with the at least one logical address 72.

As shown in step S2015, controller 2 may use a global API to generate a first, global DMO 70B (e.g., a global read-access command) according to the at least one received DMO 70 (e.g., the received read-access request). For example, in a condition where the DMO 70 is a read-access request, the first, global DMO 70B (e.g., the global read-access command 70B) may include the unique reference name 73. Additionally, the first, global DMO 70B may include tier identification 75. As elaborated herein, DMO 70B may be global in a sense that it may be independent of, or agnostic to characteristics of underlying storage tiers 600 (e.g., respective storage schemes, storage block size, etc.).

As shown in step S2020, controller 2 may customize the first, global DMO 70B (e.g., the read-access command) as elaborated herein in relation to FIG. 3, according to at least one property or characteristic of the selected tier, by an appropriate driver module (e.g., elements 65 of FIG. 3). The appropriate driver module (e.g., 65A) may be associated with or correspond to the selected tier (e.g., 600A) and may customize the global DMO 70B to match the corresponding tier's characteristics, such as the tier's 600 addressing scheme, size of physical data blocks, and the like, so as to obtain a second, tier-customized DMO 70C (e.g., a second read-access command 70C).

As shown in steps S2025 and 2030, controller 2 may use the second read-access command to search the selected storage tier (e.g., 600A) for a data element 71 that corresponds to the unique reference name 73, and may retrieve the at least one data element 71 (e.g., a content of data element 71 and/or a pointer thereto) from the selected tier (e.g., 600A), in a process commonly referred to as content-based addressing, as known in the art.

Figure 6:
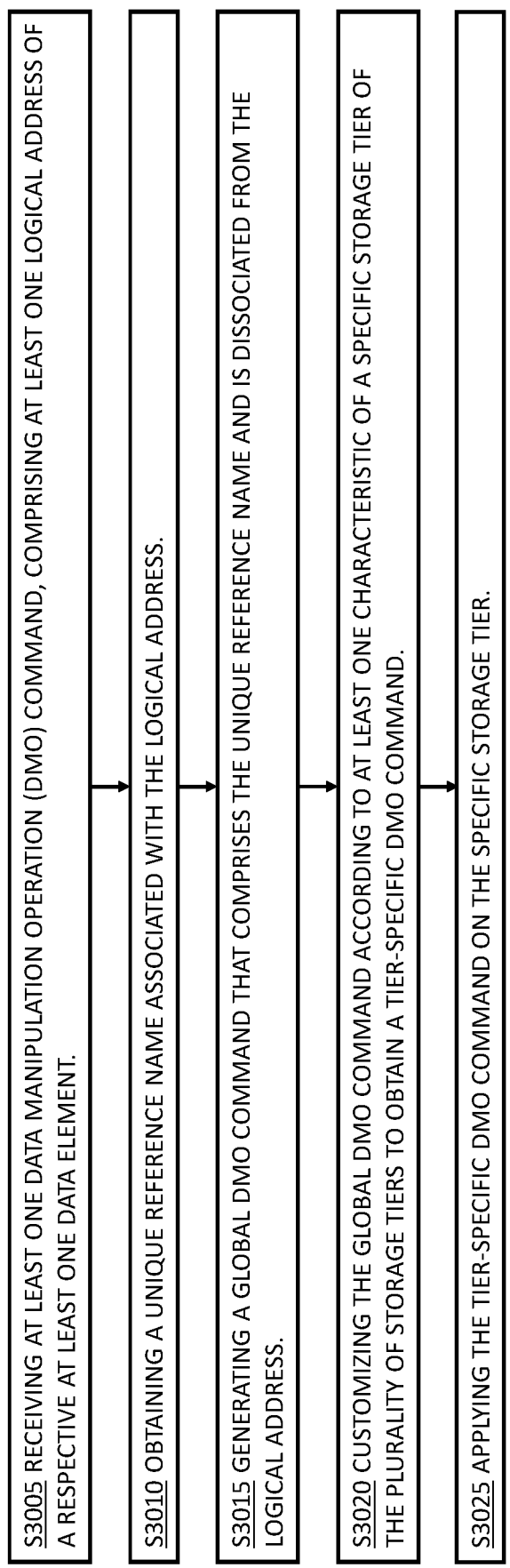
FIG. 6, is a flow diagram, depicting a method of management of multi-tier storage by at least one processor or controller, according to some embodiments.

Reference is now made to FIG. 6, which is a flow diagram, depicting a method of management of multi-tier storage by at least one processor or controller (e.g., element 110 of FIG. 3), according to some embodiments.

As shown in step S3005, the at least one processor may receive at least one data manipulation operation (DMO) command 70, comprising at least one logical address 72 of a respective at least one data element 71.

As shown in step S3010, the at least one processor 110 may obtain a unique reference name 73 associated with the logical address 72. For example, the DMO may be or may include at least one data write request, for storing at least one data object 71 (e.g., a file, a data structure, and the like) one a storage tier 600. Storage tier 600 may be or may include one or more storage devices (e.g., an SSD device, a Flash memory device, etc.). The at least one processor may compute or calculate at least one unique reference name 73 from a content or a value of the at least one data object (e.g., by applying a CRC function or a cryptographic hash function on the value of the at least one data object).

As shown in step S3015, the at least one processor 110 may generate a global DMO command that may include the unique reference name 73 and may be dissociated from the logical address 72, as explained herein.

As shown in step S3020, at least one dedicated driver 65 may customize the global DMO 70B command, according to at least one characteristic of a specific storage tier of the plurality of storage tiers to obtain a tier-specific DMO command 70C.

As shown in step S3025, at least one dedicated driver 65 may apply the tier-specific DMO command 70C on the respective, specific storage tier 600.

Embodiments of the present invention provide an improvement over state-of-the-art computer data storage systems by facilitating transfer or flow of data between computing devices and/or a plurality of storage devices or multiples tiers as referred to herein, where the one or more storage devices or tiers have different characteristics, such as different storage schemes and/or different block sizes.

A practical application of the present invention may facilitate such transfer of data without requiring translation of data access requests between different tiers, and thus without consuming Lime or computational resources from computing devices accessing the multi-tier storage system.

Embodiments of the present invention may include addressing data on one or more tiers in a manner that is media-independent and/or tier-independent, in a sense that it may be dissociated or unrelated to any specific addressing scheme and may thus enable data management operations to be agnostic of tier-specific structure and addressing scheme, as elaborated herein. Such media-independent addressing provides an improvement over state-of-the-art storage systems by facilitating introduction of new tiers to the multi-tier storage system, that may include new media types and may employ novel addressing schemes, without affecting existing data management functions or references.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method of managing a plurality of storage tiers by at least one processor, method comprising:
    receiving at least one data manipulation operation (DMO) command, comprising at least one logical address of a respective at least one data element;
    obtaining a unique reference name associated with the logical address;
    generating a global DMO command that comprises the unique reference name and is dissociated from the logical address;
    customizing the global DMO command according to at least one characteristic of a specific storage tier of the plurality of storage tiers to obtain a tier-specific DMO command; and
    applying the tier-specific DMO command on the specific storage tier.

2. The method of claim 1, wherein generating a global DMO is performed by a global Application Programming Interface (API) that is agnostic to at least one characteristic of the plurality of storage tiers.

3. The method of claim 1, wherein the DMO is selected from a list comprising: a write-access command, a write-access acknowledgement, a read-access command, a read-access acknowledgement, an erase command, a transfer command and a copy command.

4. The method of claim 1, wherein the received DMO further comprises a content of at least one data element, and wherein the method further comprises:
    computing the unique reference name based on the content of the at least one data element; and
    associating the unique reference name with the logical address.

5. The method of claim 1 wherein the at least one characteristic of a specific storage tier is selected from a list comprising the storage media's type, storage media's size, the storage media's addressing scheme and size of physical storage blocks on the storage media.

6. A method of managing a plurality of storage tiers by at least one processor, method comprising:
    receiving at least one write-access request, comprising at least one of a data element for storage, a logical address associated with the data element and a tier identifier for a selected tier,
    computing a unique reference name based on the content of the at least one data element, and associating the unique reference name with the logical address;
    generating a first write-access command, comprising the unique reference name and the at least one data element;
    customizing the first write-access command according to at least one characteristic of the selected tier by a driver associated with the selected tier, to obtain at least one second write-access command;

using the second write-access command to associate the unique reference name with at least one physical location on the selected tier, and storing the at least one data element at the associated at least one physical location.

7. The method of claim 6, further comprising:

receiving at least one read-access request, comprising at least one of a logical address and a tier identifier of a selected tier, obtaining a unique reference name that is associated with the at least one logical address;

generating a first read-access command, comprising the unique reference name;

customizing the first read-access command according to at least one characteristic of the selected tier by a driver associated with the selected tier, to obtain at least one second read-access command;

using the second read-access command to search the selected storage tier for a data element that corresponds to the unique reference name; and retrieving the at least one data element from the selected tier.

8. The method of claim 7, wherein the at least one characteristic is selected from a list comprising: a storage media type, a storage media size, an addressing scheme of a storage media and a size of storage blocks of a storage media.

9. The method of claim 8, wherein the at least one data element for storage is a data container, comprising a plurality of data elements, and wherein the logical address associated with the data container includes at least one of: a container identifier and an address offset to a data element within the data container, and wherein computing of a unique reference name is applied to each of the data elements.

10. The method of claim 7, further comprising:

receiving a transfer request of a data element from a first tier to a second tier, wherein the transfer request comprises at least one of a logical address, a tier identifier of the first tier and a tier identifier of the second tier;

obtaining, by a driver associated with the first tier, a read-access command that complies with the addressing scheme of the first tier;

using the read-access command to retrieve the at least one data element from the first tier;

obtaining, by a driver associated with the second tier, a write-access command that complies with the addressing scheme of the second tier, using the second write-access command to associate the unique reference name with at least one physical location on the second tier; and storing the data element at the associated at least one physical location on the second tier.

11. The method of claim 6, wherein storing the at least one data element on the selected tier further comprises:

searching the selected storage tier for a data element that corresponds to the unique reference name;

if such a data element is not located on the selected storage tier, then storing the at least one data element on the selected tier, and responding to the write-access request with a first message; and if such a data element is located on the selected storage tier, then responding to the write-access request with a second message, without storing the at least one data element on the selected tier.

12. A system for managing a plurality of storage tiers, the system comprising: a non-transitory memory device, wherein modules of instruction code are stored, and a processor associated with the memory device, and configured to execute the modules of instruction code, whereupon execution of said modules of instruction code, the processor is further configured to perform at least one of:

receive at least one DMO command, comprising at least one logical address of a respective at least one data element;

obtaining a unique reference name associated with the logical address;

generating a global DMO command that comprises the unique reference name and is dissociated from the logical address;

customizing the global DMO command according to at least one characteristic of a specific storage tier of the plurality of storage tiers to obtain a tier-specific DMO command; and applying the tier-specific DMO command on the specific storage tier.

13. The system of claim 12, wherein the processor is further configured to generate the global DMO by a global API, that is agnostic to at least one characteristic of the plurality of storage tiers.

14. The system of claim 12, wherein the DMO is selected from a list may include: a write-access command, a write-access acknowledgement, a read-access command, a read-access acknowledgement, an erase command, a transfer command and a copy command.

15. The system of claim 12, wherein the received DMO further may include a content of at least one data element, and wherein the processor is further configured to:

compute the unique reference name based on the content of the at least one data element; and associate the unique reference name with the logical address.

16. The system of claim 12 wherein the at least one characteristic of a specific storage tier is selected from a list consisting of: the storage media's type, storage media's size, the storage media's addressing scheme and size of physical storage blocks on the storage media.

\* \* \* \* \*